United States Patent [19]

Yamamoto

[11] Patent Number: 4,786,949
[45] Date of Patent: Nov. 22, 1988

[54] PHOTOGRAPHIC PRINTER

[75] Inventor: Takashi Yamamoto, Kanagawa, Japan

[73] Assignee: Fuji Photo Film Co., Ltd., Kanagawa, Japan

[21] Appl. No.: 108,676

[22] Filed: Oct. 15, 1987

[30] Foreign Application Priority Data

Oct. 15, 1986 [JP] Japan .................. 61-157945

[51] Int. Cl.⁴ .................. G03B 27/74; G03B 27/80
[52] U.S. Cl. .................. 355/68; 355/66
[58] Field of Search .................. 355/66, 67, 68

[56] References Cited

U.S. PATENT DOCUMENTS

| | | | |
|---|---|---|---|
| 3,480,363 | 11/1969 | Stewart | 355/68 |
| 3,639,058 | 2/1972 | Kimura | 355/68 |
| 3,702,732 | 11/1972 | Sliwkowski | 355/68 |
| 3,709,613 | 1/1973 | Zahn et al. | 355/68 |
| 3,743,416 | 7/1973 | Widmer et al. | 355/68 |
| 3,817,617 | 6/1974 | Weinert | 355/68 |

Primary Examiner—Monroe H. Hayes
Attorney, Agent, or Firm—Sughrue, Mion, Zinn, Macpeak & Seas

[57] ABSTRACT

A photographic printer of the type having a printing lens which is disposed between an image projecting unit including an illumination lamp and a negative carrier, and a photographic paper on which an image is printed, and is adapted to move up and down along the printing light path to vary the conjugate length of the printer in order to change printing magnification, the photographic printer including an image sensing unit comprising an image sensor, a reflection mirror for reflecting and deflecting the printing light toward the image sensor, a zoom lens for focusing the reflected and deflected printing light onto the image sensor. The image projecting unit and the image sensing unit are associated to move along the printing optical path as one body.

4 Claims, 2 Drawing Sheets

PHOTOGRAPHIC PRINTER

BACKGROUND OF THE INVENTION

The present invention relates to a photographic printer of the type in which printing magnification is variable and, more particularly to a photographic printer in which no focus-adjustment of an optical system of a scanner is required when printing magnification is varied.

There are various sizes of photographic films such as 35 mm size films, Brownie films, 110-size films and so forth, some of which can be used in full and half size. For making prints from these different sizes of films, a photographic printer is generally adapted to vary its printing magnification by changing a conjugate length of its printing lens.

Meanwhile, recent photographic printers have an exposure control system including an optical scanner comprising an optical system and an image sensor for detecting densities of a great number of points of an image recorded on the film. Based on the detected densities, image characteristic values are obtained so as to perform an exposure control with a high accuracy. Since the scanner is generally so disposed as to have its optical axis inclined with respect to the printing optical axis, the image sensor receives a distorted image on its image receiving surface. This image distortion can be corrected by the provision of a reflection mirror removably disposed, or otherwise a half mirror fixedly disposed, in the printing optical axis in order to turn and direct at a right angle an image of the film to the image sensor.

In the case of the above described scanner incorporated in the photographic printer in which the conjugate length of printing lens can be varied to change its printing magnification, the optical system of the scanner can not focus a sharp image on the image sensor when printing magnification is changed. For this reason, the focus of the optical system of the scanner is to be readjusted every time the printing magnification is changed.

OBJECT OF THE INVENTION

It is an object of the present invention to provide a photographic printer in which no readjustment of focus of the scanner is required even though a printing magnification is changed.

SUMMARY OF THE INVENTION

According to the present invention, the photographic printer includes an optical scanner unit which comprises a mirror for partially reflecting and deflecting printing light passed through a negative film, a zoom lens for forming an image of the negative film, and an image sensor on which the image of the negative film is projected. This scanner unit is moved together with an illumination lamp and a negative carrier along the path of the printing light as one body. Due to the movement of the optical scanner unit together with the printing lamp and negative carrier, the object distance of the zoom lens of the optical scanner unit does not change when the printing magnification is changed. Therefore, the only requirement for the optical scanner unit is to adjust the focal length of the zooming lens, namely, without refocusing the zooming lens according to changed printing magnifications.

DETAILED DESCRIPTION OF THE INVENTION

Figure 1:
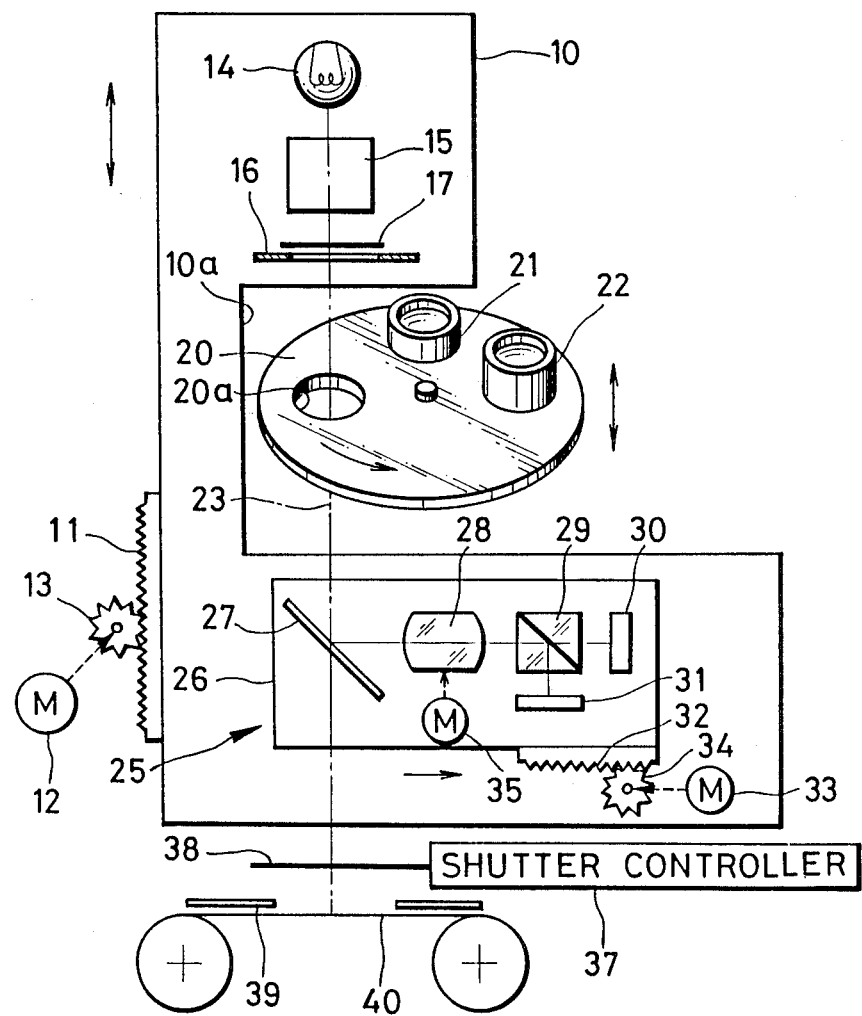
FIG. 1 is a schematic illustration showing a photographic printer embodying the present invention.

Referring to FIG. 1 showing an erecting type photographic printer embodying the present invention, there is a slidable housing 10 of the photographic printer having a rack 11 attached to its side wall which is engaged by a pinion 13 driven by a motor 12. Disposed in the upper section of the housing 10 is a light source such as a lamp 14. White illumination light emanating from the lamp 14 is diffused by a mixing box 15 and thereafter is applied to a photographic film, for example a negative film 17, placed on a negative carrier 16.

Formed at the middle of the housing 10 is a space 10a for receiving a revolving lens holding disk 20 therein. The lens holding disk 20, which is supported by the photographic printer for rotation, has a circular opening 20a for measuring light and has a plurality of, for example two in this embodiment, printing lenses 21 and 22, having different focal lengths, mounted thereon. The lens holding disk 20 is adapted not only to be rotatable but also to rise and fall along the printing optical path 23 so as to vary the conjugate length of the printing lens placed in the printing optical path in order to change printing magnification.

Arranged in the lower section of the housing 10 of the photographic printer is an optical scanner unit 25 having a reflection mirror 27, a zoom lens 28, a beam splitter 29, and a pair of image sensors 30 and 31, all of which are well known per se, enclosed in a slidable housing 26 having a rack 32 engaged by a pinion 34 driven by a motor 33. The zoom lens 28 is driven by a motor 35 cooperated therewith to change its focal length according to the size of the negative film from which prints are to be made.

Below the housing 10 of the photographic printer, there is a shutter 38 controlled by a shutter controller 37 to open and close. Between the shutter 38 and a photographic paper 40, there is a mask member 39 which has an exposure aperture variable in size according to printing magnifications.

In operation of the above described photographic printer of the present invention, prior to a light measurement, the motor 33 is actuated to move the housing 26 of the optical scanner unit 25 to the left, as viewed in FIG. 1, through the rack-and-pinion engagement 32-34 so as to locate the reflection mirror 27 in the printing optical path 23, and at 45 degrees with respect thereto. In cooperation with the movement of the housing 26 of the optical scanner unit 25, the lens holding disk 20 is rotated to align the circular opening 20a with the printing optical path 23 for light measurement. Printing light emanating from the lamp 14, after being sufficiently diffused by the mixing box 15, illuminates the negative film 17 and thereafter passes through the circular opening 20a of the lens holding disk 20. After passing through the circular opening 20a the light reaches the reflection mirror 27 so as to be turned at right angle and is divided into two light beams by the beam splitter 29 after passing the zoom lens 28. The splitted beam forms a negative image on each image sensor 30, 31 having an image size corresponding to the size of the negative film 17.

Besed on outputs from the respective image sensor 30 and 31, densities of a great number of points of the negative image are detected in order to calculate a proper printing exposure. For performing printing, the lens holding disk 20 is turned to locate a proper printing lens having the required focal length, for example the printing lens 21 in this embodiment, in the printing optical path 23. Simultaneously, the motor 33 is actuated to move the optical scanner unit 25 to the right, as viewed in FIG. 1, through the rack-and-pinion engagement 32-34 so as to place it out of the optical printing path 23. Immediately after the removal of the optical scanner unit 25 from the optical printing path 23, the shutter controller 37 causes the shutter 38 to open for a period of time determined on the basis of the obtained proper printing exposure, thereby exposing the photographic paper 40 to form a latent image thereon.

In order to change the printing magnification, one of printing magnification setting keys (not shown) is selectively operated. According to the printing magnification indicated by the operated key, the lens holding disk 20 is risen or fallen and simultaneously the motor 12 is caused to rotate so as to move the housing 10 up or down along the optical printing path 23 by a predetermined vertical distance. Due to the rotation of the lens holding disk 20 and the movement of the housing 10, the relative position between the printing lens and the negative film 17 is changed to vary the conjugate length of the printing lens located in the printing optical path 23. Upon the varying of the conjugate length of printing lens, the optical scanner 25 and the negative carrier 16 move as one body, therefore, the length of an object point is maintained constant relative to the zoom lens 28 so that the zoom lens 28 forms a sharply focused image of the negative film 17 on each the image sensor 30 and 31. If a different size of negative film is placed on the negative carrier 16, the motor 35 is actuated to adjust the zoom lens 28 so as to vary the size of image focused on each image sensor 30, 31 according to the different size of negative film.

In the case where it is impossible to obtain a required printing magnification only by moving the printing lens 21, a printing lens 22 having a different focal length is selected and the lens holding disk 20 is axially moved up or down according to the focal length of the selected printing lens 22. When printing is actually intended, the lens holding disk 20 is turned to bring the printing lens 22 into alignment with the printing optical path 23.

Figure 2:
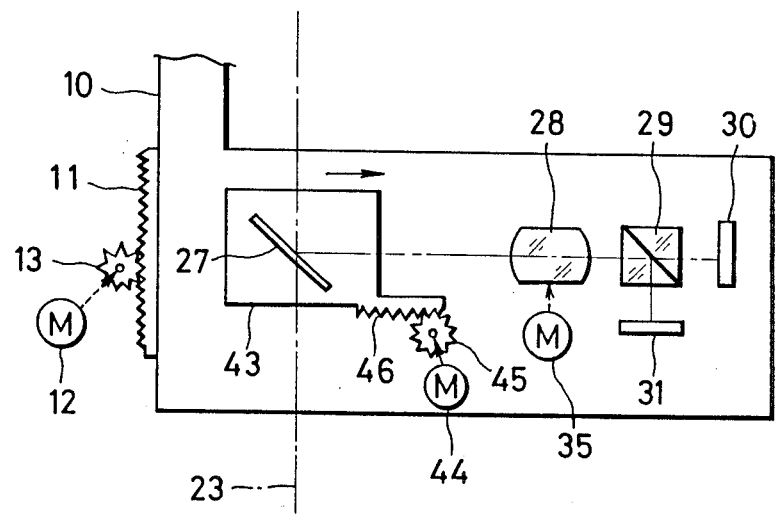
FIG. 2 is a schematic illustration showing an optical scanner unit of the photographic printer of another embodiment of the present invention.

FIG. 2 shows another preferred embodiment of the present invention wherein only the reflection mirror 27 of the optical scanner unit is adapted to be movable. The reflection mirror 27 is fixedly incorporated in a housing 43 which is supported in the housing 10 for horizontal movement. For causing this horizontal movement, the housing 32 is provided with a rack 46 in cooperation with a pinion 44 which is driven by means of a motor 44. Prior to printing, the motor 44 is actuated to move the the housing 43 to the right side, as viewed in FIG. 2, so as to remove the reflection mirror 27 from the printing path 23.

Figure 3:
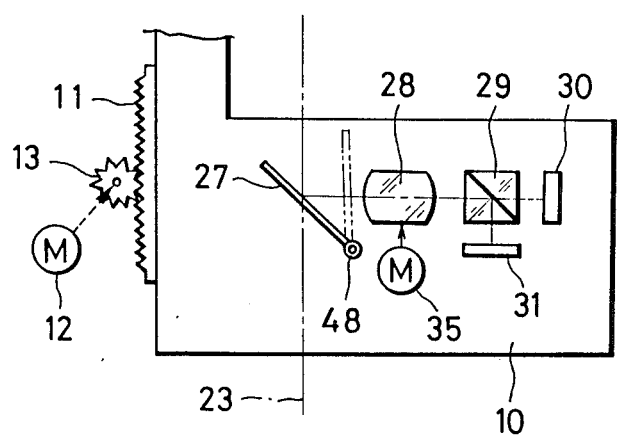
FIG. 3 is a schematic illustration similar to FIG. 2 showing an optical scanner unit of the photographic printer of still another embodiment of the present invention.

FIG. 3 shows still another preferred embodiment of the present invention wherein the optical scanner is stationarily arranged and the reflection mirror 27 is hinged at 48 for swinging movement. The reflection mirror 27 is swung up to a position shown by a double dotted line in FIG. 3 prior to printing.

Although the present invention has been described by way of a monochromatic photographic printer, it is to be noted that the present invention may be applied to a color photographic printer. In this case, it is required to provide color regulating filters such as cyan, mazenta, and yellow filters which are removably, independently insertable in the printing path 23 so as to produce a printing light properly mixed according to calculated exposures.

In any embodiment described above, the motor-driven rack-and-pinion mechanism for moving up and down the housing to vary the conjugate length of the printing lens may be replaced by any well known mechanism including, for example, a chain drive or a wire drive mechanism. On the other hand, the motor-driven rack-and-pinion mechanism for the optical scanner unit may be replaced with a driving mechanism having rails on which the optical scanner unit is shifted by means of, for example, a chain or a wire driving mechanism.

Although the present invention has been fully described by way of the preferred embodiments thereof with reference to the accompanying drawings, it is to be noted that various changes and modifications are apparent to those skilled in the art. Therefore, unless such changes and modifications otherwise depart from the scope of the present invention, they should be construed as included therein.

What is claimed is:

1. A photographic printer of the type having a printing lens disposed between a negative carrier and a photographic paper which is displaceable along a printing optical path to vary a printing magnification of said photographic printer, said photographic printer comprising;

image projecting means including an illumination lamp and said negative carrier for projecting an image of a negative held by said negative carrier;
   image sensing means displaceably located in said printing optical path for sensing said projected image, said image sensing means comprising an image sensing element, a reflection mirror removably disposed in said printing optical path for reflecting and deflecting printing light toward said image sensing element, and a zoom lens for focusing said reflected and deflected printing light onto said image sensor; and
   means for moving said image projection means and said image sensing means along said printing optical path as one body.

2. A photographic printer as defined in claim 1, wherein said image projecting means and said image sensing means are supported by a supporting member for linear movement along said printing optical path.

3. A photographic printer as defined in claim 2, wherein said image sensing means is movable relative to said supporting member so as to displace said image sensing means mirror from said printing optical path.

4. A photographic printer as defined in claim 2, wherein at least said reflection mirror is displaceable from said printing optical path.

* * * * *